(12) United States Patent
Henderson et al.

(10) Patent No.: US 11,065,561 B2
(45) Date of Patent: *Jul. 20, 2021

(54) SAMPLE DEGASSER DILUTION CONTROL SYSTEM (71) Applicant: Halliburton Energy Services, Inc., Houston, TX (US)

(72) Inventors: Matthew Hay Henderson, Inverbervie (GB); Neil Patrick Schexnaider, Rayne, LA (US); Paul Brown, Aberdeen (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/818,587

(22) Filed: Mar. 13, 2020

(65) Prior Publication Data

US 2020/0215460 A1 Jul. 9, 2020

Related U.S. Application Data (63) Continuation of application No. 15/735,681, filed as application No. PCT/US2015/047193 on Aug. 27, 2015, now Pat. No. 10,625,179.

(51) Int. Cl.
*B01D 19/00* (2006.01)
*E21B 21/06* (2006.01)
*E21B 49/08* (2006.01)

(52) U.S. Cl.
CPC ..... *B01D 19/0005* (2013.01); *B01D 19/0063* (2013.01); *E21B 21/067* (2013.01); *E21B 49/086* (2013.01)

(58) Field of Classification Search
CPC .. E21B 21/067; E21B 49/086; B01D 19/0005
See application file for complete search history.

(56) References Cited

U.S. PATENT DOCUMENTS 2,715,450 A 8/1955 Bliss et al.
2,923,151 A * 2/1960 Engle ................... G01N 1/2211
73/152.04

(Continued)

FOREIGN PATENT DOCUMENTS

WO 2004027208 4/2004
WO 2010065028 6/2010

OTHER PUBLICATIONS

U.S. Appl. No. 15/735,681, "Corrected Notice of Allowability", dated Jan. 30, 2020, 2 pages.

(Continued)

*Primary Examiner* — John Fitzgerald
(74) *Attorney, Agent, or Firm* — Kilpatrick Townsend & Stockton LLP (57) ABSTRACT A degasser system may comprise a mass flow controller device and a sample pump coupled to a sample degasser for controlling the dilution of gases extracted from drilling fluid in the sample degasser by a dilution fluid, such as nitrogen gas. The mass flow controller may inject the dilution fluid into the tank of the sample degasser to dilute the gases extracted from the drilling fluid. The dilution fluid may be aspirated or sparged into the sample degasser. The sample pump may extract a sample of the gases separated from the drilling fluid by the sample degasser. The rate of injection of the dilution fluid into the sample degasser and the rate of extraction of the gas sample from the drilling fluid may be adjustable to control the dilution of the gas sample for analysis.

20 Claims, 5 Drawing Sheets

(56) References Cited

U.S. PATENT DOCUMENTS

| | | | |
|---|---|---|---|
| 3,213,939 A * | 10/1965 | Records | E21B 21/08 |
| | | | 175/65 |
| RE26,220 E * | 6/1967 | Records | E21B 21/08 |
| | | | 175/66 |
| 3,363,404 A * | 1/1968 | Griffin, III | E21B 21/067 |
| | | | 96/165 |
| 3,381,536 A | 5/1968 | Horeth et al. | |
| 3,895,927 A * | 7/1975 | Bournham, Sr. | E21B 21/067 |
| | | | 96/163 |
| 4,350,505 A | 9/1982 | Mallory et al. | |
| 4,365,977 A * | 12/1982 | Egbert | E21B 21/067 |
| | | | 95/248 |
| 4,397,659 A * | 8/1983 | Gowan | E21B 21/067 |
| | | | 95/248 |
| 5,458,010 A | 10/1995 | Traina et al. | |
| 5,487,312 A | 1/1996 | Risse et al. | |
| 5,596,154 A | 1/1997 | Baughman et al. | |
| 6,389,878 B1 | 5/2002 | Zamfes | |
| 7,392,138 B2 | 6/2008 | Frechin et al. | |
| 9,593,576 B2 | 3/2017 | Rowe | |
| 9,988,901 B2 | 6/2018 | Rowe | |
| 10,625,179 B2 * | 4/2020 | Henderson | E21B 21/067 |
| 2001/0017223 A1 | 8/2001 | Michael | |
| 2009/0199618 A1 * | 8/2009 | Evrard | B01D 19/0063 |
| | | | 73/19.09 |
| 2009/0293605 A1 | 12/2009 | Evrard et al. | |
| 2011/0094736 A1 | 4/2011 | Evrard | |
| 2011/0219853 A1 | 9/2011 | Henderson | |
| 2011/0303463 A1 | 12/2011 | Lessi | |
| 2013/0263647 A1 | 10/2013 | Barrett et al. | |
| 2014/0209384 A1 | 7/2014 | Hanson | |
| 2015/0322783 A1 * | 11/2015 | Rowe | G01N 33/225 |
| | | | 175/42 |
| 2016/0160641 A1 * | 6/2016 | Rowe | H01J 49/0027 |
| | | | 250/282 |
| 2017/0096893 A1 | 4/2017 | Graves et al. | |
| 2017/0167257 A1 | 6/2017 | Rowe | |
| 2017/0268333 A1 | 9/2017 | Pickell et al. | |
| 2018/0171786 A1 * | 6/2018 | Kasprzykowski | E21B 49/005 |
| 2018/0320463 A1 * | 11/2018 | Bertrand | B01D 19/0052 |
| 2018/0361273 A1 | 12/2018 | Henderson et al. | |
| 2020/0215460 A1 * | 7/2020 | Henderson | E21B 21/067 |

OTHER PUBLICATIONS

U.S. Appl. No. 15/735,681, "Notice of Allowance", dated Dec. 13, 2019, 9 pages.

CA2,992,175, "Office Action", dated Nov. 6, 2019, 3 pages.

Halliburton, "Constant Volume Extractor (CVE)", available at http://www.halliburton.com/en-US/ps/sperry/drilling/surface-data-logging/gas-analysis/cve.page at least as early as, Jul. 31, 2015, 1 page.

Halliburton, "Eagle Gas Extraction System", available at http://www.halliburton.com/en-US/ps/sperry/drilling/geosteering-services/eagle-gas-extraction-system.page at least as early as, Jul. 31, 2015, 1 page.

PCT/US2015/047193, "International Search Report and Written Opinion", dated May 12, 2016, 13 pages.

* cited by examiner

SAMPLE DEGASSER DILUTION CONTROL SYSTEM

CROSS-REFERENCE

The present application is a continuation of U.S. patent application Ser. No. 15/735,681, now U.S. Pat. No. 10,625,179, titled "Sample Degasser Dilution Control System," and filed Dec. 12, 2017, which is a National Stage Entry of PCT Application No. PCT/US2015/047193, titled "Sample Degasser Dilution Control System", filed Aug. 27, 2015, the entirety of each of which is incorporated by reference herein.

TECHNICAL FIELD

The present disclosure relates generally to drilling fluid sample degassers and, more particularly (although not necessarily exclusively), to controlling the dilution of gas samples extracted from drilling fluid sample degassers.

BACKGROUND

Drilling systems may utilize drilling fluid to assist in drilling boreholes into a surface of the earth. Drilling fluid may serve a variety of functions for a drilling system, including, but not limited to, cooling and cleaning a drill bit of the drilling system during operation, allowing a mud motor of the drilling system to convert fluid energy to mechanical energy to provide shaft rotation to the drill bit, removing drill cuttings from a borehole excavated by the drill bit, and transporting the drill cuttings to the surface of the borehole. The circulation of drilling fluid within a drilling borehole and the interaction between the downhole environment and the drilling fluid may affect or modify the properties of the drilling fluid. The properties of the drilling fluid may be analyzed subsequent to circulation in the borehole to determine the drilling environment of the drilling system.

DETAILED DESCRIPTION

Certain aspects and examples of the present disclosure relate to a dilution control system for a sample degasser to control the dilution of gases extracted from drilling fluid by controlling the rate of injection of a dilution fluid (e.g., nitrogen gas, helium gas, water, etc.) into the sample degasser and the rate of extraction of a gas sample from the sample degasser. The sample degasser may be coupled to a mass flow controller device that may inject the dilution fluid into a tank of the sample degasser containing drilling fluid that was previously circulated in a wellbore. The rate upon which the mass flow controller device may inject the dilution fluid into the tank may be adjusted to allow for dilution of the gases in the tank to be controlled. The sample degasser may also be coupled to a sample pump that may extract a sample of the diluted gas from the drilling fluid. The rate upon which the sample pump extracts the gas sample may similarly be adjusted to allow the dilution of the gases extracted from the drilling fluid to be controlled. A dilution factor for analyzing the gas sample may be determined based on the injection rate of the dilution fluid and the extraction rate of the gas sample.

Oilfield technicians may create a record of data for a downhole environment in a borehole used by a drilling system by, in part, examining the drilling fluid circulated through the borehole using a sample degasser. A number of parameters related to a sample degasser and the drilling fluid passing through the sample degasser may allow the technicians to determine the portions of an extracted sample that accurately represent the properties of the borehole. For example, the level of accuracy may be influenced by: a rotor speed of the sample degasser, a volume of the drilling fluid located in the sample degasser, a temperature of the drilling fluid located in the sample degasser, a flow rate of the drilling fluid in and out of the sample degasser, and a dilution of a gas sample eluted from the drilling fluid in the sample degasser. The more of these parameters that may be controlled, the more representative the gas sample may be of the downhole environment in which the drilling system is operating. For instance, analyzing a gas sample from the drilling fluid may allow a technician to determine the position and level of hydrocarbons within the drilling area of the borehole based on a measure of hydrocarbon gas concentrations in the drilling fluid. The level of the hydrocarbon gas in the drilling fluid may affect how the borehole is to be drilled or may be indicative of the downhole drilling environment (e.g., the quality of a reservoir).

As sample degassers repeatedly extract gas samples from the drilling fluid, a balance gas may be aspirated into the sample degasser to volumetrically replace the sample drawn from the degasser. In some sample degassers, the balance gas may be atmospheric air. The atmospheric air may dilute the gases in the drilling fluid as the gas samples are replaced. Due to the introduction of atmospheric air to the degasser, the gas samples may include elements of the atmospheric air when extracted. The presence of atmospheric air in the extracted gas sample may affect the gas sample during calibration. For example, the calibration gases used to calibrate the gas sample may be nitrogen balanced. The presence of noble gases in the atmospheric air included in the gas sample (and not present in the calibration gases) may skew the lower and upper limits of the range of hydrocarbon component gases in the gas sample. A dilution factor may be utilized to account for the atmospheric air included in the gas sample, but the dilution factor may only be an estimated value as the amount of hydrocarbon component gases present in a given gas sample is unknown to determine the percentage of atmospheric air present. The presence of a known dilution fluid introduced to and extracted from the drilling fluid at a known rate may allow the dilution factor to be a known value that may be stabilized or controlled to provide an accurate measure of the hydrocarbon component gases or other gases absorbed by the drilling fluid from the downhole environment.

Figure 1:
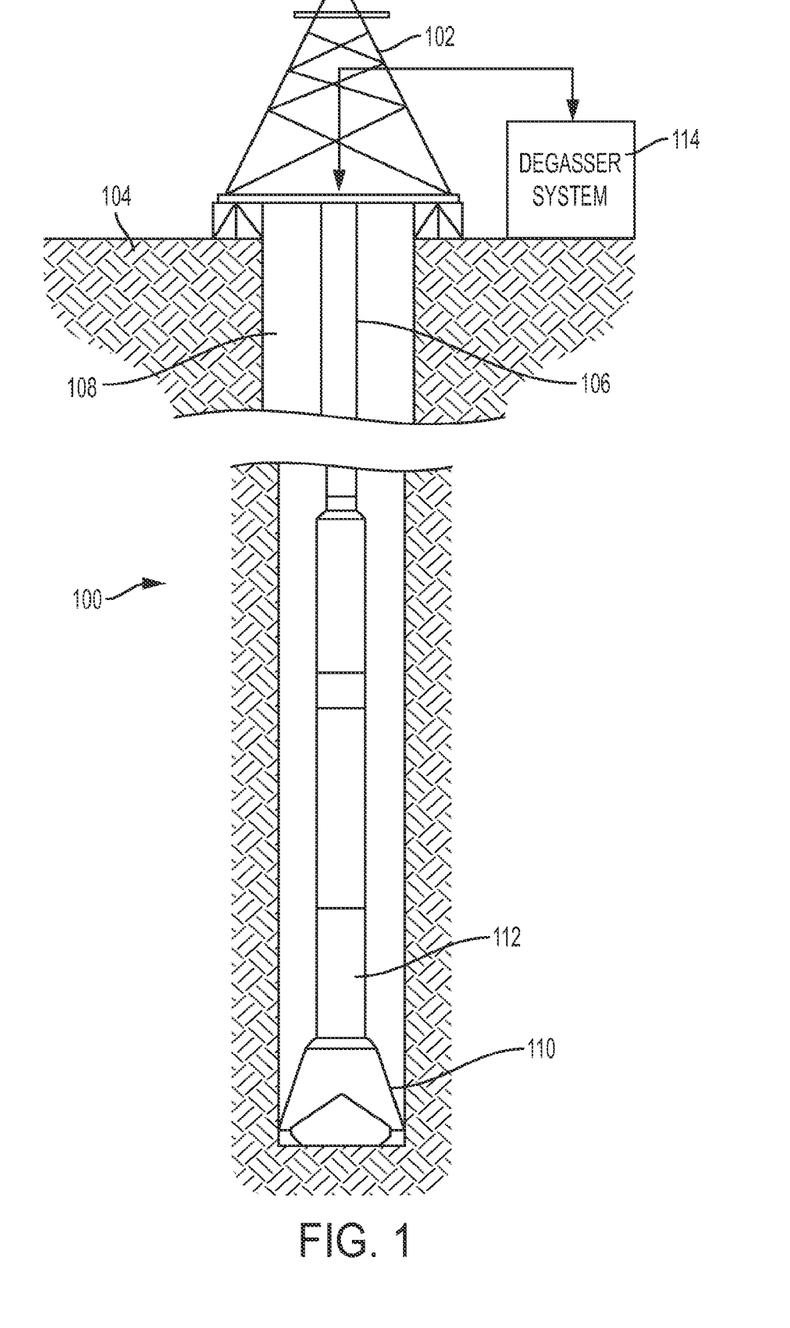
FIG. 1 is a cross-sectional schematic diagram depicting an example of a drilling system that includes a degasser system according to one aspect of the present disclosure.

Various aspects of the present disclosure may be implemented in various drilling systems. FIG. 1 illustrates an example of such a drilling system 100 that includes a derrick 102 at a surface 104. The derrick 102 may support components of the drilling system 100, including a drill string 106. The drill string 106 may include segmented pipes that may extend below the surface 104 in a borehole, such as a wellbore 108. The drill string 106 may transmit drilling fluid (or drilling mud) necessary to operate a drill bit 110. The weight of the drill string 106 may provide an axial force on the drill bit 110. The drill string 106 may include downhole components 112 (e.g., a bottom hole assembly, a down hole motor assembly, etc.). Although FIG. 1 shows the drill bit 110 oriented in a downward direction, the drill bit 110 may be oriented in any direction in the wellbore 108 without departing from the scope of the present disclosure.

The drilling fluid transported through the drill string 106 may be released in the wellbore 108 near the drill bit 110. The drilling fluid may serve multiple purposes, including cooling the drill bit 110 and other downhole components 112 as they rotate and interface with the surfaces of the wellbore 108 and transmitting hydraulic energy to the downhole components 112 that may be converted to mechanical energy for operation of the drill bit 110. As the drilling fluid travels through the wellbore 108 back to the surface 104, the drilling fluid may clean the wellbore 108 and may carry cuttings (e.g., rocks) excavated by the drill bit 110 to the surface 104 to be removed from the wellbore 108.

The drilling system 100 may also include a degasser system 114 that may be positioned proximate to the derrick 102 at the surface 104 of the wellbore 108. The degasser system 114 may receive drilling fluid that has been circulated by the drilling system 100 in the wellbore 108. As the drilling fluid circulates in the wellbore 108 and interfaces with the downhole environment, properties of the wellbore 108 and downhole environment may be transferred to or alter the properties drilling fluid. For example, the drilling fluid may absorb gases from formations exposed in the wellbore 108 as the drilling fluid interfaces with the surfaces of the wellbore 108 and the downhole environment. The degasser system 114 may include various devices and components for sampling and analyzing drilling fluid from the wellbore 108 to determine the properties of the wellbore 108 based on the gases absorbed during circulation of the drilling fluid in the wellbore 108. Though placement of certain examples of the assemblies disclosed herein may vary without departing from the scope of the present subject matter, the assemblies of the present disclosure may be included in the degasser system 114.

Figure 2:
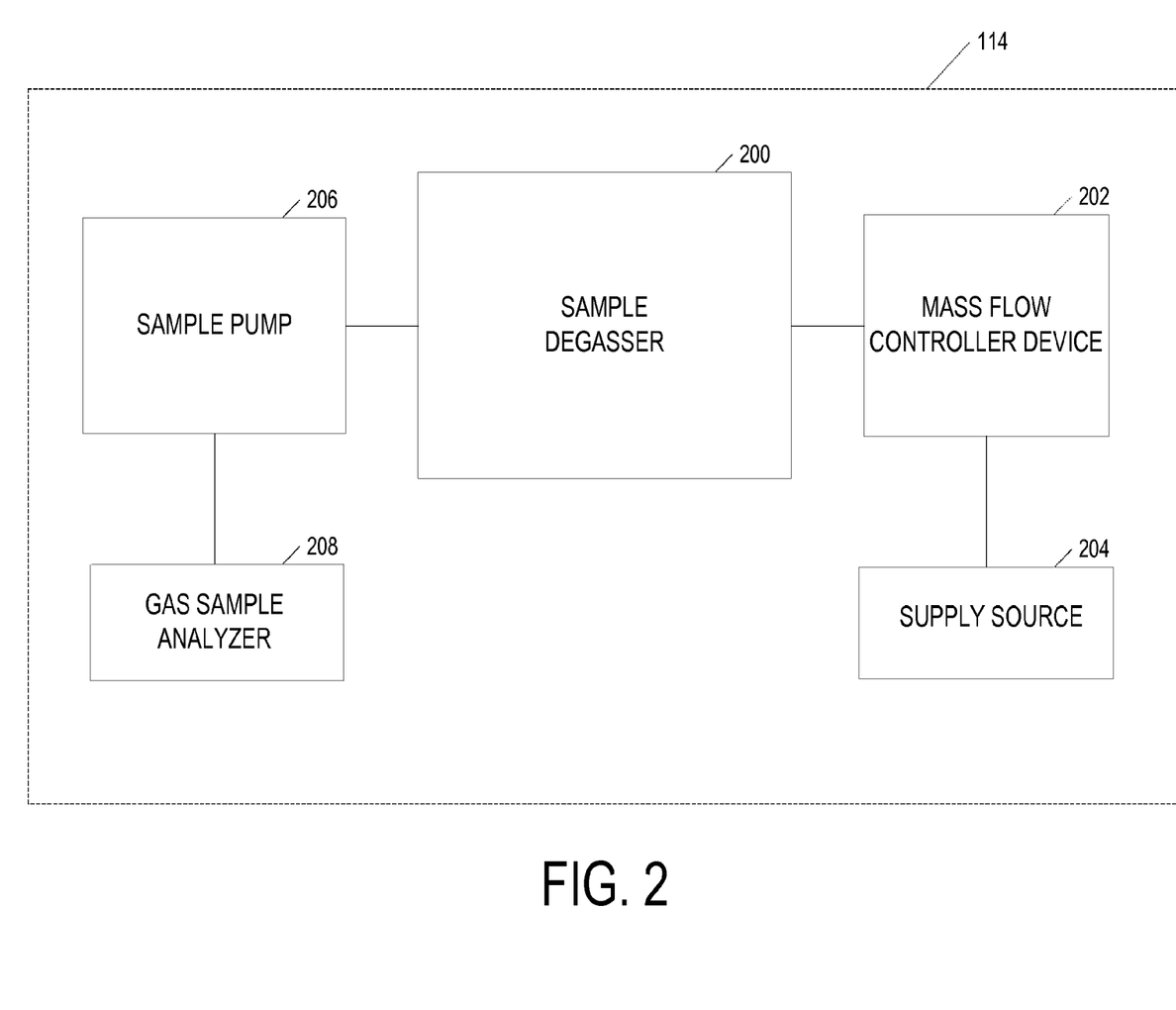
FIG. 2 is a block diagram depicting a degasser system according to one aspect of the present disclosure.

FIG. 2 is a block diagram showing an example of devices and components that may be included in the degasser system 114. The degasser system 114 may include a sample degasser 200. The sample degasser 200 may be directly or indirectly coupled to the wellbore 108 or components therein to receive drilling fluid that has been circulated in the wellbore 108. The sample degasser 200 may be used as a device to remove or separate gases from the drilling fluid. In some aspects, the sample degasser 200 may be a hydrocarbon degasser for removing hydrocarbon component gases from the drilling fluid. The hydrocarbon component gases may be present in the drilling fluid based on the circulation of the drilling fluid in the wellbore 108. In some aspects, subsequent to removing the hydrocarbon component gases from the drilling fluid, the sample degasser 200 may discharge the drilling fluid to a retention pit or other component of the drilling system 100 to be recirculated through the drill string 106 and into the wellbore 108.

The sample degasser 200 may be coupled to a mass flow controller device 202. The mass flow controller device 202 may control the flow of a dilution fluid into the sample degasser 200. In some aspects, the mass flow controller device 202 may be coupled to a supply source 204 that may supply the dilution fluid to the mass flow controller for providing to the sample degasser 200. The dilution fluid may be a substance in a liquid or gas phrase that may be injected into the sample degasser 200 to dilute gas samples extracted from the drilling fluid in the tank of the sample degasser 200. In some aspects, the dilution fluid may be an inert gas. The inert gas may be a chemical element that is reluctant to undergo an ionic change when mixed with the hydrocarbon component gases and other gases that may be found in the drilling fluid. For example, the inert gas that may be injected into the sample degasser 200 by the mass flow controller device 202 may be one of the noble gases (e.g., helium, xenon, etc.) or nitrogen gas ($N_2$). In other aspects, the dilution fluid may include a gas that may not be inert. For example, the dilution fluid may include a tracer gas injected into the sample degasser 200 for purposes of dilution or timing, or a fortifying gas injected into the sample degasser 200 for purposes of excitation or enhancing a signal strength corresponding to concentration of the gas sample. In additional aspects, the dilution fluid may include water or another liquid. The supply source 204 may be a bottle, generator, or other supply source for supplying the dilution fluid to the mass flow controller device 202. The rate of flow of the dilution fluid into the sample degasser 200 by the mass flow controller device 202 may be determined or adjusted to control the dilution of the gases extracted from the drilling fluid located in the sample degasser 200.

A sample pump 206 may also be coupled to the sample degasser 200 for extracting a gas sample from the sample degasser 200. For example, the sample pump 206 may extract a sample of the gases separated from the drilling fluid by the sample degasser 200. In some aspects, the sample pump 206 may use compressed air to extract the gas sample by the Venturi effect. In other aspects, the sample pump 206 may include a motor (e.g., a dc motor) to control the speed of the sample pump 206 that, in turn, controls the extraction rate of the gas sample from the sample degasser 200. The rate of extraction of the gas sample from the sample degasser 200 by the sample pump 206 in concert with the rate of flow of the dilution fluid into the sample degasser 200 by the mass flow controller device 202 may be determined or adjusted by a technician or operator for controlling the dilution of the gases extracted from the drilling fluid located in the sample degasser 200.

The degasser system 114 may also include a gas sample analyzer 208. In some aspects, the sample pump 206 may be coupled to a gas sample analyzer 208 as shown in FIG. 2. In other aspects, gas sample analyzer 208 may be separate from the sample pump 206. For example, the gas sample analyzer 208 may be operated by a third party or located in a separate area of the oilfield. The gas sample extracted from the sample degasser 200 by the sample pump 206 may be transmitted to the gas sample analyzer 208 for analysis. In some aspects, the gas sample analyzer 208 may calibrate the gas sample by comparing the gas sample to a calibration gas that is nitrogen balanced. In some aspects, the dilution fluid injected into the tank of the drilling fluid may be nitrogen gas. When the gas sample, diluted by nitrogen gas, is calibrated with a calibration gas that is nitrogen balanced, the calibration may yield a more accurate representation of the actual gases absorbed by the drilling fluid in the downhole environment.

The gas sample analyzer 208 may determine the properties of the gas sample based on the calibration. The gas sample may include the gaseous components absorbed by the drilling fluid downhole and a sample of the dilution fluid injected into the sample degasser 200. The gas sample analyzer 208 may apply a dilution factor during calibration of the gas sample to account for dilution fluid injected into the sample degasser 200 by the mass flow controller device 202. The calibration of the gas sample based on the dilution factor may result in a determination of a true sample of the gaseous components absorbed by the drilling fluid downhole. The dilution factor may be known, rather than estimated, based on the rate that the dilution fluid was injected into the sample degasser 200 by the mass flow controller device 202 and the rate of extraction of the gas sample using the sample pump 206. The injection rate and the extraction rate may be adjusted to increase or decrease the dilution of the gas sample.

In some examples, the gas sample analyzer 208 may determine an insufficient level of the true sample of the gaseous components of the drilling fluid absorbed downhole. The low gas readings may be misinterpreted as a malfunction in the sample pump 206 or the extraction components of the sample degasser 200, particularly in areas known to have lower levels of gas (e.g., portions of the North Sea in offshore drilling environments). To compensate for the low gas readings, the true sample may be boosted by decreasing the injection rate of the dilution fluid into the sample degasser 200 by the mass flow controller device 202 (e.g., from 5 liters per minute ("LPM") to 2 LPM). Conversely, the injection rate may be increased to retard high gas readings (e.g., from 5 LPM to 10 LPM) for areas where the concentration of gas is higher. The concentration of the sample gases extracted from the sample degasser 200 (e.g., an extracted hydrocarbon component concentration) may be directly and proportionally affected by the extraction rate. For instance, assuming the sample degasser 200 is operating at a constant speed, the drilling fluid is flowing in and out of the sample degasser 200 at a constant flow rate, the temperature of the drilling fluid remains constant, and the extraction rate is consistent, the concentration of each gas sample component may be halved by doubling the injection rate of the dilution fluid (e.g., doubling the rate of injection of nitrogen gas into the sample degasser may halve a hydrocarbon component concentration).

Figure 3:
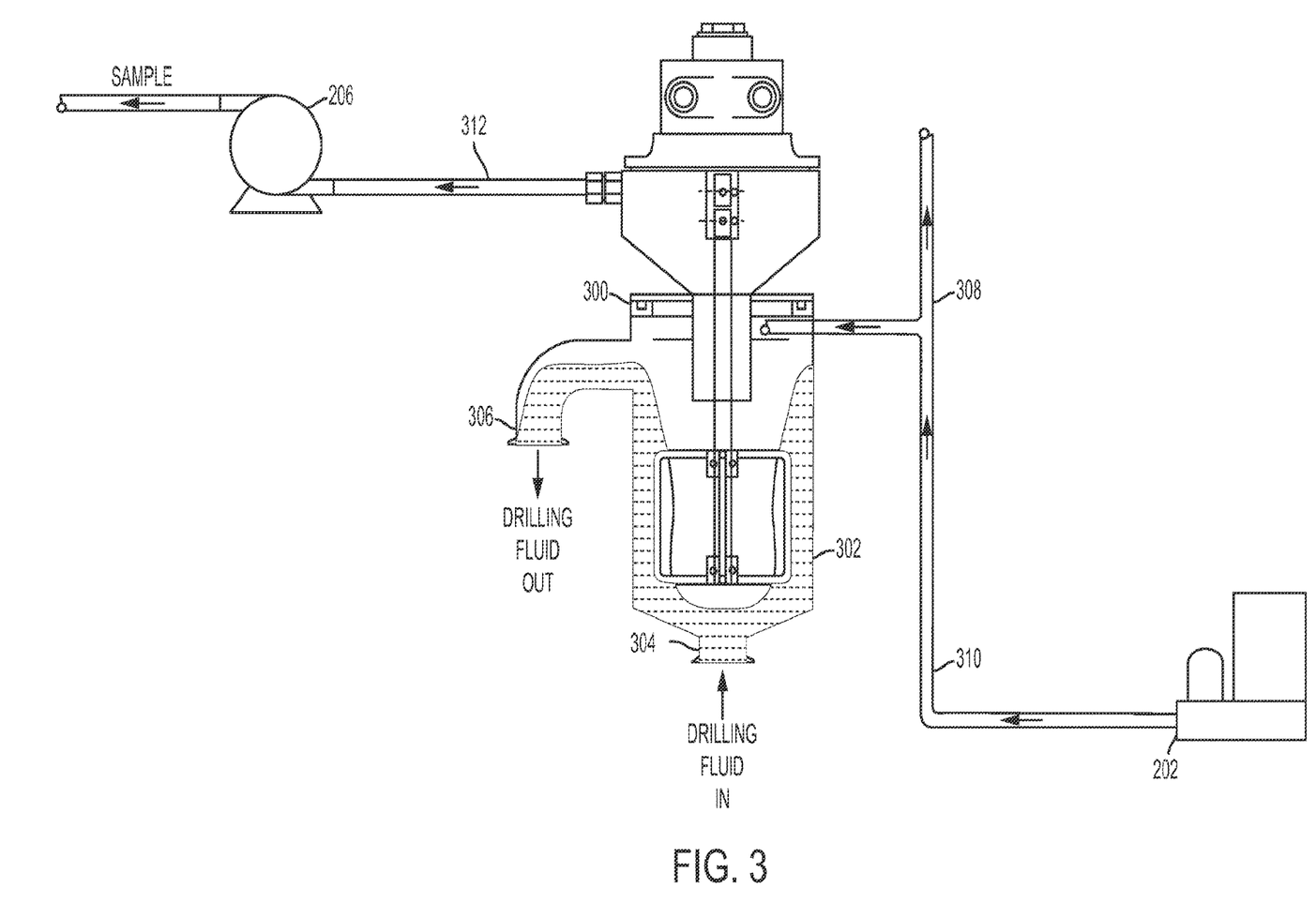
FIG. 3 is a cross-sectional schematic diagram depicting an aspirated dilution control system in a degasser system according to one aspect of the present disclosure.
Figure 4:
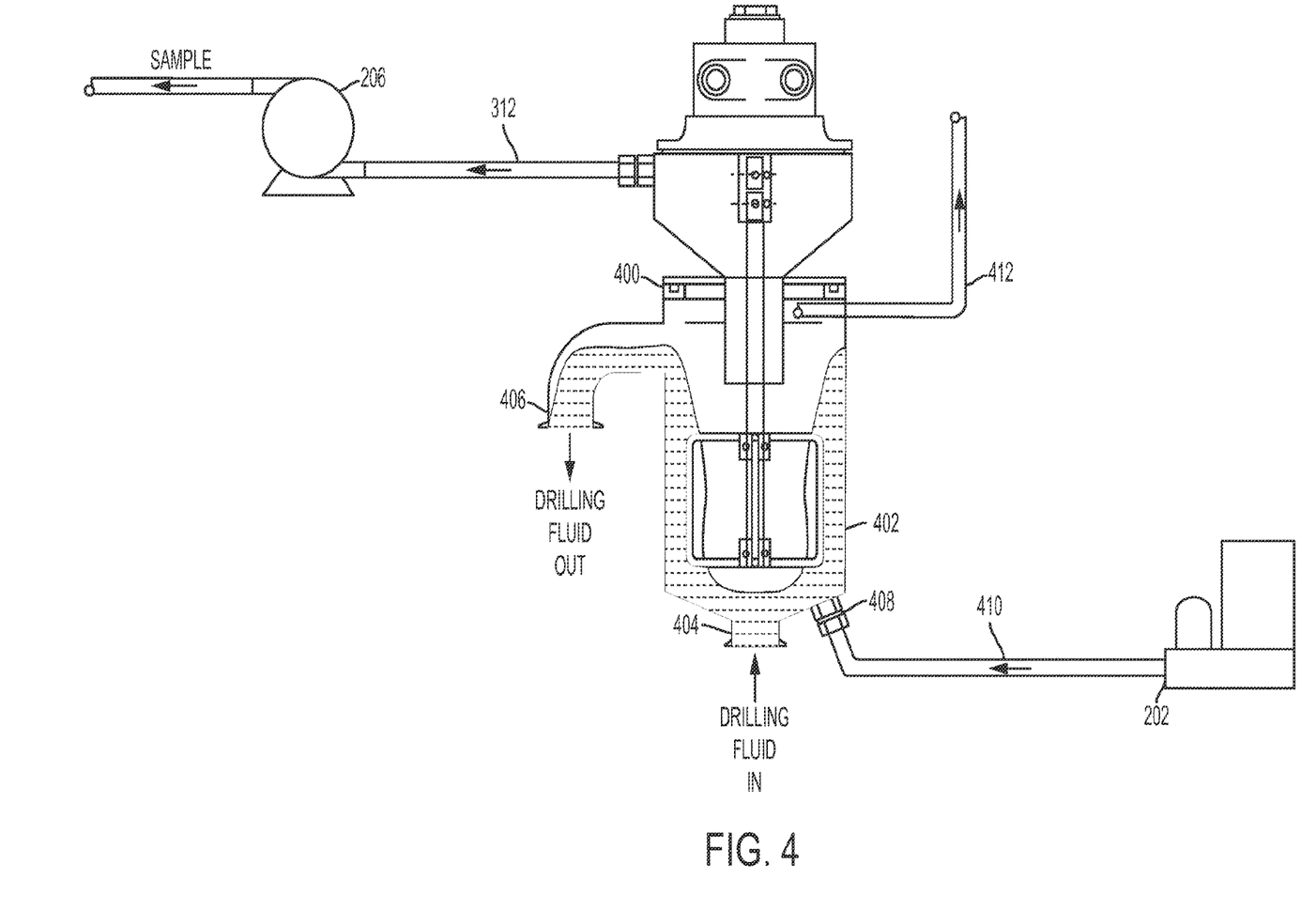
FIG. 4 is a cross-sectional schematic diagram depicting a sparged dilution control system in a degasser system according to one aspect of the present disclosure.

FIGS. 3 and 4 show examples of alternate dilution control systems that may be included in the degasser system 114 shown in FIG. 2. FIG. 3 shows an aspirated dilution control system using a sample degasser 300. The sample degasser 300 includes a tank 302 in which drilling fluid may be located, and a fluid inlet valve 304 and a fluid outlet valve 306 to allow the drilling fluid to enter and exit the tank 302, respectively. In some aspects, the fluid inlet valve 304 may be directly or indirectly coupled to the wellbore 108 by components of the drilling system 100 to receive drilling fluid previously been circulated in the wellbore 108. In additional and alternative aspects, the fluid outlet valve 306 may be coupled to the drill string 106 through a retention pit or other components of the drilling system 100 to recirculate the drilling fluid in the drill string 106 and wellbore 108. The fluid inlet valve 304 and the fluid outlet valve 306 may operate together to maintain a constant volume of drilling fluid in the tank 302.

The sample degasser 300 also includes an atmospheric pressure vent 308. In some aspects, the atmospheric pressure vent 308 may prevent gas from building up in the tank 302 of the sample degasser 300. For example, the atmospheric pressure vent 308 may compensate for the differential between the injection rate and the extraction rate to stabilize the dilution factor (e.g., the atmospheric pressure vent 308 may release gas from the tank 302 at 1 LPM when the injection rate is 6 LPM and the extraction rate is 5 LPM). The mass flow controller device 202 may be coupled to the sample degasser 300 by coupling a fluid line 310 to the atmospheric pressure vent 308. In this manner, the atmospheric pressure vent 308 may serve an additional purpose as a makeup vent to allow the dilution fluid flowing from the mass flow controller device 202 through the line 310 to become aspirated gas in the tank 302 of the sample degasser 300. The mass flow controller device 202 may inject the dilution fluid into the tank 302 by aspirating the dilution fluid (e.g., aspirating nitrogen gas) into the tank 302 through the atmospheric pressure vent 308 to dilute the gases extracted from the drilling fluid in the tank 302. The rate at which the mass flow controller device 202 injects the dilution fluid into the tank 302 may be adjusted to control or alter the dilution of the gases extracted from the drilling fluid. The sample degasser 300 may be coupled to the sample pump 206 by a fluid line 312. The sample pump 206 may extract a sample of the gases separated from the drilling fluid by the sample degasser 300 at an extraction rate that may be adjusted, in concert with the rate of injection of the dilution fluid into the sample degasser 300, to control the dilution of the dilution fluid in the sample. In some aspects, the sample pump 206 may transmit the extracted gas sample to a gas sample analyzer 208 to determine the gases included in the gas sample.

FIG. 4 shows a sparged dilution control system using a sample degasser 400. The sample degasser 400 includes a tank 402 in which drilling fluid may be located and a fluid inlet valve 404 and a fluid outlet valve 406 to allow the sample degasser 400 to maintain a constant volume of drilling fluid in the tank 402. The sample degasser 400 also includes a dilution fluid intake valve 408. The dilution fluid intake valve 408 may allow the dilution fluid to flow directly into the tank 402 of the sample degasser 400. The dilution fluid intake valve 408 may be coupled to the mass flow controller device 202 by a fluid line 410 that may transport the dilution fluid from the mass flow controller device 202 to the dilution fluid intake valve 408. The mass flow controller device 202 may inject the dilution fluid into the tank 402 of the sample degasser 400 by sparging the dilution fluid into the drilling fluid located in the tank 402. The dilution fluid may present in the drilling fluid as bubbles. The sample degasser 400 may agitate the drilling fluid to reduce the surface tension of the drilling fluid and break the bubbles created in the drilling fluid by sparging the dilution fluid. The agitation of the drilling fluid may cause the dilution fluid to separate from the drilling fluid as well as hydrocarbon component gases and any other gases present in the drilling fluid to separate from the drilling fluid. The sample degasser 400 may be coupled to the sample pump 206 by the line 312. The sample pump 206 may extract a sample of the gases separated from the drilling fluid by the sample degasser 400 at an extraction rate that may be adjusted, in concert with the rate of injection of the dilution fluid into the sample degasser 400, to control the dilution of the gases by the dilution fluid sparged in the drilling fluid.

The sample degasser 400 also includes an atmospheric pressure vent 412. In some aspects, the atmospheric pressure vent 412 may prevent gases from building up in the tank 302 of the sample degasser 300. Although the sample degasser 400 shown in FIG. 4 includes the atmospheric pressure vent 412, a sample degasser may be operable in a sparged dilution control system as described in FIG. 4 without an atmospheric pressure vent 412. For example, the sample degasser 400 may be a closed-type sample degasser (e.g., closed to ambient pressure). The dilution fluid may be injected into the tank 402 of the sample degasser 400 as a sparge gas as described with respect to FIG. 4. To maintain the pressure within the tank 402 without the atmospheric pressure vent 412, the rate of injection of the dilution fluid into the tank 402 by the mass flow controller device 202 may equal the rate of extraction of the gas sample by the sample pump 206.

Figure 5:
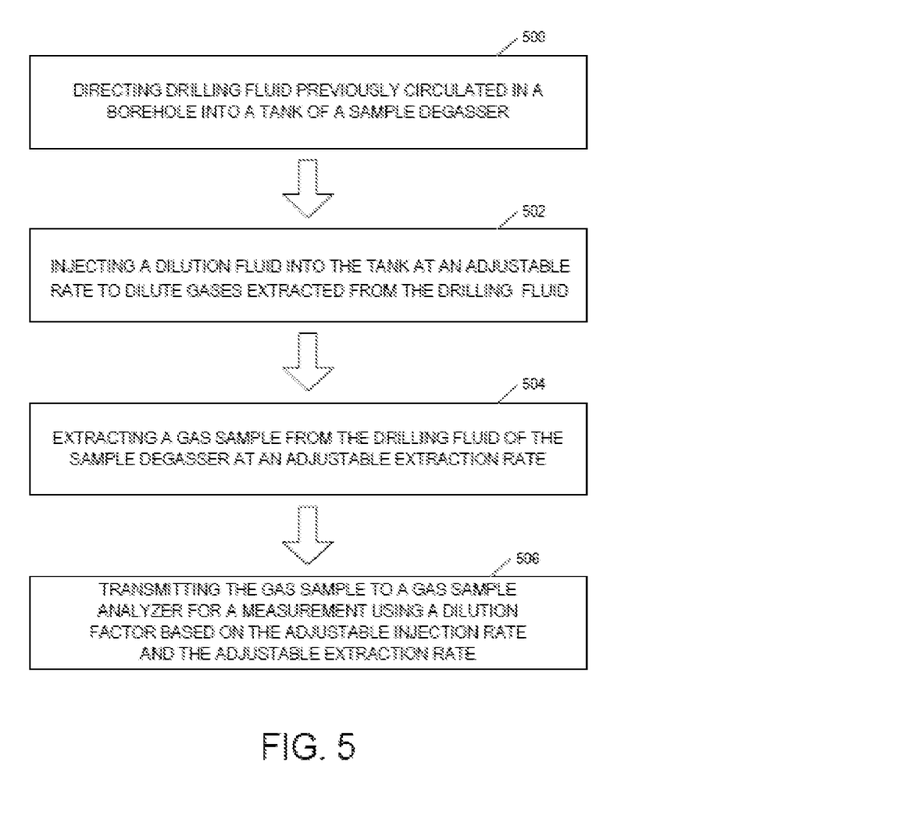
FIG. 5 is a flow diagram depicting a process for controlling the dilution of a gas sample according to one aspect of the present disclosure.

FIG. 5 shows a flow diagram of a process for controlling the dilution of a gas sample extracted from a sample degasser. The process is described with respect to the dilution control systems of FIGS. 3 and 4, although other implementations are possible without departing from the scope of the present disclosure.

In block 500, drilling fluid previously circulated in the borehole (e.g., wellbore 108) is directed into the tank 302, 402 of the sample degasser 300, 400. The sample degasser 300, 400 may include a fluid inlet valve 304, 404. The fluid inlet valve 304, 404 may be directly or indirectly coupled to the wellbore 108 to allow fluid circulating in the wellbore 108 to enter the tank 302, 402 of the sample degasser 300, 400.

In block 502, the dilution fluid is injected into the tank 302, 402 of the sample degasser 300, 400 to dilute the gases extracted from the drilling fluid in the tank 302, 402. The dilution fluid may be injected into the tank 302, 402 using the mass flow controller device 202 operating at an adjustable injection rate. In some aspects, the mass flow controller device 202 may be coupled to the sample degasser 300 by the atmospheric pressure vent 308 functioning as a makeup vent. The mass flow controller device 202 may receive the dilution fluid (e.g., nitrogen gas) from a supply source (e.g., a nitrogen generator) and inject the dilution fluid into the tank 302 through the atmospheric pressure vent 308 as an aspirated gas. The dilution fluid may aspirate the drilling fluid as the dilution fluid is injected into the tank 302.

In other aspects, the mass flow controller device 202 may be coupled to the sample degasser 400 by a dilution fluid intake valve 408. The mass flow controller device 202 may receive the dilution fluid (e.g., nitrogen gas) from a supply source (e.g., a nitrogen generator) and inject the dilution fluid directly into the tank 402 and through the drilling fluid in the tank 402 by sparging. The dilution fluid may sparge the drilling fluid as it is injected into the tank 402. The dilution fluid may form bubbles in the drilling fluid. In some aspects, the sample degasser 400 may agitate the drilling fluid in the tank 402 to break up the bubbles of dilution fluid to release the dilution fluid from the drilling fluid. In additional aspects, the agitation of the drilling fluid may also cause other gases included in the drilling fluid (e.g., hydrocarbon component gases) to be released from the drilling fluid.

The rate at which the mass flow controller device 202 allows the dilution fluid to flow into the tank 302, 402 may be adjusted based on a desired dilution of the gases extracted from the drilling fluid. For example, the rate of flow of the dilution fluid into the tank 302, 402 may be increased relative to the extraction rate of the gas sample to cause a higher dilution of the gases extracted from the drilling fluid. Conversely, the rate of flow of the dilution fluid into the tank 302, 402 may be decreased relative to the extraction rate of the gas sample to cause a lower dilution of the gases extracted from the drilling fluid.

In block 504, a gas sample is extracted from the drilling fluid by the sample pump 206 operating at an adjustable extraction rate. The sample pump 206 may be coupled to the sample degasser 300, 400 to pump out or otherwise extract samples of the gases separated from the drilling fluid by the sample degasser 300, 400. The gas sample may contain any gaseous components included in the drilling fluid received from the wellbore 108, including the dilution fluid injected into the tank 302, 402 by the mass flow controller device 202. The rate of extraction of the gas sample may be adjusted based on the desired dilution of the gases extracted from the drilling fluid. For example, the extraction rate may be decreased relative to the injection rate of the dilution fluid to cause a higher dilution of the gases extracted from the drilling fluid. Conversely, the extraction rate may be increased relative to the injection rate of the dilution fluid to cause a lower dilution of the gases extracted from the drilling fluid by the dilution fluid.

In block 506, the gas sample is transmitted to a gas sample analyzer (e.g., gas sample analyzer 208) for a measurement based on a factor of the dilution of the gases extracted from the drilling fluid by the dilution fluid. The dilution factor may be known based on the injection rate of the dilution fluid into the tank 302, 402 by the mass flow controller device 202 and the extraction rate of the gas sample by the sample pump 206. The injection rate and the extraction rate may be adjusted to increase or decrease the dilution of the gas sample. In some aspects, the injection rate and the extraction rate may also be adjusted to boost or retard the true sample of the gas sample containing the gases absorbed by the drilling fluid in the wellbore 108.

In some aspects, the systems described herein are provided according to one or more of the following examples:

Example #1

A dilution control system for a sample degasser may include a mass flow controller device coupled to the sample degasser for injecting, at an adjustable injection rate, a dilution fluid into a tank of the sample degasser having drilling fluid previously circulated in a borehole. The dilution control system may also include a sample pump coupled to the sample degasser to extract a gas sample of gaseous components of the drilling fluid at an adjustable extraction rate. The adjustable injection rate and the adjustable extraction rate may be adjustable to control a dilution of the gas sample.

Example 2

The dilution control system of Example #1 may also include the sample degasser. The sample degasser may include a fluid inlet valve and a fluid outlet valve for maintaining a constant volume of the drilling fluid that was previously circulated in a wellbore.

Example 3

The dilution control system of Examples #1-2 may also include a nitrogen supply source coupled to the mass flow controller device. The dilution fluid may include nitrogen gas for injecting into the sample degasser.

Example 4

The dilution control system of Examples #1-3 may feature the adjustable injection rate being equal to the adjustable extraction rate to allow the dilution fluid to volumetrically replace an amount of the gas sample extracted by the sample pump and to generate a stabilized dilution factor for analyzing the gas sample.

Example 5

The dilution control system of Examples #1-4 may feature the mass flow controller device being coupled to an intake valve of the sample degasser for injecting the dilution fluid into the tank by sparging the dilution fluid through the drilling fluid in the tank to dilute the gas sample.

Example 6

The dilution control system of Examples #1-4 may feature the mass flow controller device being coupled to a makeup vent of the sample degasser for injecting the dilution fluid into the tank by aspirating the dilution fluid into the tank to dilute the gas sample.

Example 7

The dilution control system of Examples #1-6 may feature the adjustable injection rate and the adjustable extraction rate being adjustable to boost or retard a reading of a portion of the gas sample corresponding to downhole gaseous components included in the drilling fluid.

Example 8

The dilution control system of Examples #1-7 may also include a gas analyzer for receiving the gas sample for analysis based on a dilution factor determined at least in part by the adjustable injection rate and the adjustable extraction rate.

Example #9

A degasser system may comprise a sample degasser including a fluid inlet valve for directing drilling fluid previously circulated in a borehole into a tank of the sample degasser and a fluid outlet valve for directing the drilling fluid out of the tank. The fluid inlet valve and the fluid outlet valve may be operable to maintain a constant volume of the drilling fluid in the tank during operation of the sample degasser. The degasser system may also include a mass flow controller device coupled to the sample degasser for injecting nitrogen gas into the tank at an adjustable injection rate to control a dilution by the nitrogen gas of gases extracted from the drilling fluid. The degasser system may also include a sample pump coupled to the sample degasser for extracting a gas sample from the drilling fluid at an adjustable extraction rate to control the dilution of the gases by the nitrogen gas.

Example #10

The degasser system of Example #9 may also include a gas analyzer system coupled to the sample pump for analyzing the gas sample based on a dilution factor calculable based on the adjustable injection rate and the adjustable extraction rate. The gas analyzer system may include one or more calibration gases that are nitrogen balanced for comparing with the gas sample.

Example #11

The degasser system of Examples 9-10 may feature the adjustable injection rate and the adjustable extraction rate being adjustable to determine a known dilution factor corresponding to the dilution of the gases by the nitrogen gas for analyzing the gas sample.

Example #12

The degasser system of Examples #9-11 may feature the adjustable injection rate and the adjustable extraction rate being adjustable to boost or retard a reading of a portion of the gas sample corresponding to downhole gaseous components included in the drilling fluid.

Example #13

The degasser system of Examples #9-12 may feature the sample degasser also including an intake valve coupled to the mass flow controller device to inject the nitrogen gas into the drilling fluid by sparging the nitrogen gas through the drilling fluid. The sample degasser may be operable to agitate the drilling fluid to release the nitrogen gas from the drilling fluid.

Example #14

The degasser system of Examples #9-14 may feature the sample degasser including an atmospheric pressure vent. The mass flow controller device may be coupled to the sample degasser through the atmospheric pressure vent to inject the nitrogen gas into the drilling fluid by aspirating the nitrogen into the tank.

Example #15

A method of drilling fluid data logging may include directing drilling fluid previously circulated in a borehole into a tank of a sample degasser. The sample degasser may maintain a constant volume of the drilling fluid in the tank using a fluid inlet valve and a fluid outlet valve. The method may also include injecting a dilution fluid into the tank to dilute gases extracted from the drilling fluid in the tank using a mass flow controller device operating at an adjustable injection rate. The method may also include extracting a gas sample from the drilling fluid using a sample pump operating degasser at an adjustable extraction rate. The method may also include transmitting the gas sample to a gas sample analyzer for a measurement using a dilution factor corresponding to a dilution of the gases by the dilution fluid and based on the adjustable injection rate and the adjustable extraction rate.

Example #16

The method of Example #15 may feature the dilution fluid comprising nitrogen gas. The method may also feature injecting the dilution fluid into the tank to include injecting the nitrogen gas into the tank from a nitrogen supply source.

Example #17

The method of Examples #15-16 may also include separating gas components of the drilling fluid from liquid components of the drilling fluid by agitating the drilling fluid to release the dilution fluid from the drilling fluid. The method may also feature injecting the dilution fluid into the tank to include sparging the dilution fluid through the drilling fluid using an intake valve of the sample degasser.

Example #18

The method of Examples #15-17 may also feature injecting the dilution fluid into the tank to include aspirating the dilution fluid into the tank through a makeup vent of the sample degasser.

Example #19

The method of Examples #15-18 may also include adjusting the adjustable injection rate or the adjustable extraction rate to modify the dilution of the gases by the dilution fluid.

Example #20

The method of Examples #15-19 may also include adjusting the adjustable injection rate or the adjustable extraction rate to boost or retard a reading by the gas sample analyzer of a portion of the gas sample corresponding to downhole gaseous components included in the drilling fluid.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A dilution control system for a sample degasser, comprising:
   a mass flow controller device couplable to the sample degasser for injecting a dilution fluid into a tank of the sample degasser having drilling fluid previously circulated in a borehole; and
   a sample pump couplable to the sample degasser to extract a gas sample of gaseous components of the drilling fluid at an adjustable extraction rate,
   wherein the adjustable extraction rate is adjustable to control a dilution of the gas sample.

2. The dilution control system of claim 1, further including a gas analyzer system configured to analyze the gas sample based on a dilution factor, wherein the gas analyzer system includes one or more calibration gases that are nitrogen balanced for comparison with the gas sample.

3. The dilution control system of claim 1, further comprising the sample degasser, wherein the sample degasser includes a fluid inlet valve and a fluid outlet valve for maintaining a constant volume of the drilling fluid that was previously circulated in a wellbore.

4. The dilution control system of claim 1, further comprising a nitrogen supply source coupled to the mass flow controller device, wherein the dilution fluid comprises nitrogen gas for injecting into the sample degasser.

5. The dilution control system of claim 1, wherein the adjustable extraction rate is selected to allow the dilution fluid to volumetrically replace an amount of the gas sample extracted by the sample pump and to generate a stabilized dilution factor for analyzing the gas sample.

6. The dilution control system of claim 1, wherein the mass flow controller device is coupled to an intake valve of the sample degasser for injecting the dilution fluid into the tank by sparging the dilution fluid through the drilling fluid in the tank to dilute the gas sample.

7. The dilution control system of claim 1, wherein the mass flow controller device is coupled to a makeup vent of the sample degasser for injecting the dilution fluid into the tank by aspirating the dilution fluid into the tank to dilute the gas sample.

8. The dilution control system of claim 1, wherein the adjustable extraction rate is adjustable to boost or retard a reading of a portion of the gas sample corresponding to downhole gaseous components included in the drilling fluid.

9. A degasser system, comprising:
   a sample degasser including a fluid inlet valve for directing drilling fluid previously circulated in a borehole into a tank of the sample degasser and a fluid outlet valve for directing the drilling fluid out of the tank, the fluid inlet valve and the fluid outlet valve being operable to maintain a constant volume of the drilling fluid in the tank during operation of the sample degasser;
   a mass flow controller device coupled to the sample degasser for injecting nitrogen gas into the tank to control a dilution by the nitrogen gas of gases extracted from the drilling fluid; and
   a sample pump coupled to the sample degasser for extracting a gas sample from the drilling fluid at an adjustable extraction rate to control the dilution of the gases by the nitrogen gas.

10. The degasser system of claim 9, further including a gas analyzer system coupled to the sample pump for analyzing the gas sample based on a dilution factor calculable based on the adjustable extraction rate, wherein the gas analyzer system includes one or more calibration gases that are nitrogen balanced for comparing with the gas sample.

11. The degasser system of claim 9, wherein the adjustable extraction rate is adjustable to determine a known dilution factor corresponding to the dilution of the gases by the nitrogen gas for analyzing the gas sample.

12. The degasser system of claim 9, wherein the adjustable extraction rate is adjustable to boost or retard a reading of a portion of the gas sample corresponding to downhole gaseous components included in the drilling fluid.

13. The degasser system of claim 9, wherein the sample degasser further includes an intake valve coupled to the mass flow controller device to inject the nitrogen gas into the drilling fluid by sparging the nitrogen gas through the drilling fluid, wherein the sample degasser is operable to agitate the drilling fluid to release the nitrogen gas from the drilling fluid.

14. The degasser system of claim 9, wherein the sample degasser includes an atmospheric pressure vent, wherein the mass flow controller device is coupled to the sample degasser through the atmospheric pressure vent to inject the nitrogen gas into the drilling fluid by aspirating the nitrogen into the tank.

15. A method of drilling fluid data logging, comprising:
   directing drilling fluid previously circulated in a borehole into a tank of a sample degasser, wherein the sample degasser maintains a constant volume of the drilling fluid in the tank using a fluid inlet valve and a fluid outlet valve;
   injecting a dilution fluid into the tank to dilute gases extracted from the drilling fluid in the tank using a mass flow controller device operating at an adjustable injection rate;
   extracting a gas sample from the drilling fluid; and
   transmitting the gas sample to a gas sample analyzer for a measurement using a dilution factor corresponding to a dilution of the gases by the dilution fluid and based on the adjustable injection rate.

16. The method of claim 15, wherein the dilution fluid comprises nitrogen gas, wherein injecting the dilution fluid into the tank includes injecting the nitrogen gas into the tank from a nitrogen supply source.

17. The method of claim 15, further including separating gas components of the drilling fluid from liquid components of the drilling fluid by agitating the drilling fluid to release the dilution fluid from the drilling fluid,
- wherein injecting the dilution fluid into the tank includes sparging the dilution fluid through the drilling fluid using an intake valve of the sample degasser.

18. The method of claim 15, wherein injecting the dilution fluid into the tank includes aspirating the dilution fluid into the tank through a makeup vent of the sample degasser.

19. The method of claim 15, further comprising extracting the gas sample from the drilling fluid at an adjustable extraction rate.

20. The method of claim 19, further comprising adjusting the adjustable injection rate or the adjustable extraction rate to boost or retard a reading by the gas sample analyzer of a portion of the gas sample corresponding to downhole gaseous components included in the drilling fluid.

\* \* \* \* \*